US010843796B2

(12) United States Patent
Marvin et al.

(10) Patent No.: US 10,843,796 B2
(45) Date of Patent: Nov. 24, 2020

(54) ROTORCRAFT ADVANCED AUTOPILOT CONTROL ARRANGEMENT AND METHODS

(71) Applicant: Merlin Technology, Inc., Kent, WA (US)

(72) Inventors: Mark Marvin, Tacoma, WA (US); Marc Feifel, Seattle, WA (US); Nicholas Albion, Burien, WA (US); John E. Mercer, Gig Harbor, WA (US)

(73) Assignee: Merlin Technology, Inc., Kent, WA (US)

( * ) Notice: Subject to any disclaimer, the term of this patent is extended or adjusted under 35 U.S.C. 154(b) by 234 days.

(21) Appl. No.: 13/763,582

(22) Filed: Feb. 8, 2013

(65) Prior Publication Data

US 2014/0027565 A1     Jan. 30, 2014

Related U.S. Application Data

(60) Provisional application No. 61/597,570, filed on Feb. 10, 2012, provisional application No. 61/597,555, (Continued)

(51) Int. Cl.
    *B64C 27/57*      (2006.01)
    *B64C 13/28*      (2006.01)
    (Continued)

(52) U.S. Cl.
    CPC .......... *B64C 27/57* (2013.01); *B64C 13/0421* (2018.01); *B64C 13/341* (2018.01);
    (Continued)

(58) Field of Classification Search
    CPC ......... B64C 13/04; B64C 13/16; B64C 13/18; B64C 13/24; B64C 13/26; B64C 13/38;
    (Continued)

(56) References Cited

U.S. PATENT DOCUMENTS 2,923,503 A *   2/1960   Vogel ..................... B64C 13/04
                                                     244/223
3,058,697 A *   10/1962   Tribken ............... G05D 1/0841
                                                     244/179

(Continued)

FOREIGN PATENT DOCUMENTS

CN          1669874 A      9/2005
CN       101048640 A     10/2007

(Continued)

OTHER PUBLICATIONS

Shawn Coyle, Nov. 7, 2011, "Understanding Your Autopilot", http://www.verticalmag.com/news/article/understanding-your-autopilot-pt-3.html.*

(Continued)

*Primary Examiner* — Christopher D Hutchens

(74) *Attorney, Agent, or Firm* — Pritzkau Patent Group LLC

(57) ABSTRACT

An autopilot system includes an actuator arrangement that receives control signals to influence the flight of the helicopter in a selected one of a plurality of different flight modes. A control stick input arrangement allows flight mode selection and control with no more than a particular one of the pilot's hands in the engaged position on the stick and without moving the hand away from the engaged position. A slaved gyro output signal is based on no more than the set of sensor outputs used by the autopilot such that an autopilot display presents autopilot flight mode information while displaying a slaved gyro output. The autopilot provides for pilot selection of one of a subset of the plurality of flight modes which is customized based on a current flight status of the helicopter. An automatic autorotation mode is provided.

14 Claims, 8 Drawing Sheets

Related U.S. Application Data filed on Feb. 10, 2012, provisional application No. 61/597,581, filed on Feb. 10, 2012.

(51) Int. Cl.
| | | |
|---|---|---|
| *B64C 13/04* | (2006.01) | |
| *B64C 27/58* | (2006.01) | |
| *G05D 1/08* | (2006.01) | |

(52) U.S. Cl.
CPC ........... *B64C 27/58* (2013.01); *G05D 1/0858* (2013.01); *B64C 13/044* (2018.01)

(58) Field of Classification Search
CPC ... B64C 27/56; B64C 13/042; B64C 13/0421; B64C 13/0423; G05D 1/0016; G05D 1/0841; G05D 1/0808; G05D 1/0816; G05D 1/0061
USPC ... 244/17.13, 75.1, 175, 194, 195, 220, 221, 244/228, 234; 701/3, 11
See application file for complete search history.

(56) References Cited

U.S. PATENT DOCUMENTS

| | | | |
|---|---|---|---|
| 3,198,922 A * | 8/1965 | Rohacs | B64C 13/04 16/298 |
| 3,679,956 A | 7/1972 | Redmond | |
| 4,003,532 A | 1/1977 | Adams, Sr. et al. | |
| 4,005,835 A * | 2/1977 | Gerstine | G05D 1/0858 244/17.13 |
| 4,029,271 A * | 6/1977 | Murphy | G05D 1/102 244/17.13 |
| 4,034,605 A | 7/1977 | Green | |
| 4,091,244 A | 5/1978 | Chu et al. | |
| 4,213,584 A | 7/1980 | Tefft et al. | |
| 4,279,391 A * | 7/1981 | Adams et al. | 244/17.13 |
| 4,371,937 A * | 2/1983 | Adams et al. | 701/7 |
| 4,387,432 A | 6/1983 | Fischer et al. | |
| 4,426,607 A * | 1/1984 | Black | B64C 13/38 244/223 |
| 4,580,223 A | 4/1986 | Wright | |
| 4,584,510 A * | 4/1986 | Hollow | B64C 13/04 244/234 |
| 4,603,389 A * | 7/1986 | Griffith | G05D 1/0669 244/17.13 |
| 4,626,998 A | 12/1986 | Adams et al. | |
| 4,628,455 A * | 12/1986 | Skutecki | G05D 1/0669 244/17.13 |
| 4,739,128 A * | 4/1988 | Grisham | 200/6 A |
| 4,763,285 A | 8/1988 | Moore et al. | |
| 4,965,879 A | 10/1990 | Fischer, Jr. | |
| 5,195,700 A * | 3/1993 | Fogler et al. | 244/17.21 |
| 5,204,605 A | 4/1993 | Delattre et al. | |
| 5,299,759 A * | 4/1994 | Sherman et al. | 244/17.13 |
| 5,522,568 A * | 6/1996 | Kamen et al. | 244/17.13 |
| 5,694,014 A | 12/1997 | Hegg et al. | |
| 5,793,356 A * | 8/1998 | Svancarek et al. | 345/161 |
| 6,038,498 A | 3/2000 | Briffe et al. | |
| 6,092,919 A * | 7/2000 | Calise | G05D 1/0825 244/194 |
| 6,119,834 A | 9/2000 | Lee | |
| 6,314,343 B1 * | 11/2001 | Adams et al. | 701/3 |
| 6,325,331 B1 * | 12/2001 | McKeown | B64C 13/08 244/220 |
| 6,580,418 B1 * | 6/2003 | Grome et al. | 345/161 |
| 6,697,758 B2 * | 2/2004 | McCall et al. | 702/141 |
| 7,305,286 B1 * | 12/2007 | Younkin et al. | 701/7 |
| 7,568,662 B1 | 8/2009 | Conner | |
| 7,624,943 B2 | 12/2009 | Cerchie et al. | |
| 7,954,614 B2 | 6/2011 | Mercer | |
| 7,976,310 B2 * | 7/2011 | Bachelder et al. | 434/33 |
| 8,134,328 B2 | 3/2012 | Hanlon et al. | |
| 8,195,346 B1 * | 6/2012 | Duerksen | G05D 1/0055 701/15 |
| 8,342,455 B2 | 1/2013 | Allieta et al. | |
| 8,360,369 B2 | 1/2013 | Mercer et al. | |
| 8,886,370 B2 | 11/2014 | Carlavan | |
| 8,948,936 B2 | 2/2015 | Shue et al. | |
| 9,304,516 B2 * | 4/2016 | Christensen | G05D 1/102 |
| 2002/0030142 A1 | 3/2002 | James | |
| 2005/0173595 A1 | 8/2005 | Hoh | |
| 2006/0058928 A1 * | 3/2006 | Beard et al. | 701/11 |
| 2007/0164167 A1 * | 7/2007 | Bachelder | G05D 1/102 244/220 |
| 2007/0164168 A1 | 7/2007 | Hirvonen et al. | |
| 2007/0182590 A1 * | 8/2007 | Younkin | 340/973 |
| 2007/0221782 A1 | 9/2007 | Cerchie et al. | |
| 2008/0036617 A1 | 2/2008 | Arms et al. | |
| 2008/0294305 A1 | 11/2008 | Roesch | |
| 2010/0076625 A1 * | 3/2010 | Yoeli | B60V 1/043 701/4 |
| 2010/0123045 A1 | 5/2010 | Grieser | |
| 2010/0210391 A1 | 8/2010 | Dinger | |
| 2011/0022250 A1 * | 1/2011 | Hamburg | 701/11 |
| 2011/0031346 A1 | 2/2011 | Allieta et al. | |
| 2011/0046824 A1 | 2/2011 | Antraygue | |
| 2011/0121126 A1 | 5/2011 | Mercer et al. | |
| 2011/0137492 A1 * | 6/2011 | Sahasrabudhe et al. | 701/3 |
| 2011/0190964 A1 | 8/2011 | Petillon | |
| 2011/0276202 A1 | 11/2011 | Carlavan et al. | |
| 2012/0068004 A1 * | 3/2012 | Hatamian | 244/17.13 |
| 2012/0097800 A1 * | 4/2012 | Burroughs et al. | 244/197 |
| 2012/0277933 A1 | 11/2012 | Krogh et al. | |
| 2012/0286088 A1 * | 11/2012 | Mercer et al. | 244/17.13 |
| 2013/0261853 A1 * | 10/2013 | Shue | B64C 19/00 701/3 |
| 2014/0027564 A1 | 1/2014 | Mercer et al. | |
| 2014/0027566 A1 | 1/2014 | Mercer et al. | |
| 2014/0244078 A1 * | 8/2014 | Downey | G05D 1/0055 701/11 |

FOREIGN PATENT DOCUMENTS

| | | |
|---|---|---|
| EP | 0313470 A1 | 4/1989 |
| EP | 1840861 A2 | 10/2007 |
| EP | 1996459 B1 | 12/2008 |
| RU | 8813 U1 | 12/1998 |
| RU | 2282562 C1 | 8/2006 |
| RU | 2369907 C2 | 10/2009 |
| TW | 479131 B | 3/2002 |
| WO | 2008/065664 A2 | 6/2008 |
| WO | 2009/130576 A1 | 10/2009 |

OTHER PUBLICATIONS

The International Search Report and the Written Opinion of the International Searching Authority for International Application No. PCT/US2013/025452 which is associated with U.S. Appl. No. 13/763,582, dated May 16, 2013, Moscow, Russia.

Thai Technics.Com, Flight Direction Control, Apr. 30, 2001, Retrieved from the Internet: <URL:http://www.thaitechnics.com/helicopter/heli_control_3.html.>.

Paul G. Savage, Strapdown Inertial Navigation Integration Algorithm Design Part 1: Attitude Algorithms, Jan.-Feb. 1998, Journal of Guidance, Control, and Dynamics, vol. 21, No. 1.

Paul G. Savage, Strapdown Inertial Navigation Integration Algorithm Design Part 2: Velocity and Position Algorithms, Mar.-Apr. 1998, Journal of Guidance, Control, and Dynamics, vol. 21, No. 2.

William Premerlani, Robust Estimator of the Direction Cosine Matrix, Feb. 22, 2009, http://diydrones.com/forum/topics/robust-estimator-of-the.

William Premerlani, Wind Estimation without an Airspeed Sensor, Jan. 29, 2010, http://cliydrones.com, UAV Dev Board.

William Premerlani and Paul Bizard, Direction Cosine Matrix IMU: Theory, Jun. 26, 2010, http://diydrones.com.

The International Preliminary Report on Patentability for International Application No. PCT/US2013/025456 which is associated with U.S. Appl. No. 13/763,574, dated Jun. 16, 2014, Alexandria, Virginia.

(56) References Cited

OTHER PUBLICATIONS

The International Preliminary Report on Patentability for International Application No. PCT/US2013/025458 which is associated with U.S. Appl. No. 13/763,590, dated Aug. 12, 2014, Geneva, Switzerland.
The International Search Report and the Written Opinion of the International Searching Authority for International Application No. PCT/US2013/025456 which is associated with U.S. Appl. No. 13/763,574, dated Dec. 5, 2013, Moscow, Russia.
The International Search Report and the Written Opinion of the International Searching Authority for International Application No. PCT/US2013/025458 which is associated with U.S. Appl. No. 13/763,590, dated Dec. 5, 2013, Moscow, Russia.
The First Office Action of the the State Intellectual Property Office of People's Republic of China for Chinese Application No. 201380007952.X which is associated with International Application No. PCT/US2013/025458 which is associated with U.S. Appl. No. 13/763,590, dated Aug. 4, 2015. (Machine translation included).
Written Opinion of the International Preliminary Examining Authority for International Application No. PCT/US2013/025452 which is associated with U.S. Appl. No. 13/763,582, dated Jan. 15, 2015, Alexandria, VA.
Applicant Response to the Jan. 15, 2015 Written Opinion of the International Preliminary Examining Authority for International Application No. PCT/US2013/025452 which is associated with U.S. Appl. No. 13/763,582, dated Feb. 13, 2015, Los Angeles, CA.
Extended European Search Report for International Application No. PCT/US2013/025458 which is associated with U.S. Appl. No. 13/763,590, dated Sep. 2, 2015, Munich, Germany.
The Third Office Action of the the State Intellectual Property Office of People's Republic of China for Chinese Application No. 201380007952.X which is associated with International Application No. PCT/US2013/025458 which is associated with U.S. Appl. No. 13/763,590, dated Jul. 28, 2016.
Extended European Search Report for European Application No. 13787117.4 which is associated with International Application No. PCT/US2013/025456 which is associated with U.S. Appl. No. 13/763,574, dated Jun. 6, 2016, Munich, Germany.
The First Office Action of the State Intellectual Property Office of People's Republic of China for Chinese Application No. 201380007947.9 which is associated with International Application No. PCT/US2013/025452 which is associated with U.S. Appl. No. 13/763,582, dated May 11, 2016.
Partial Supplementary European Search Report for European Application No. 13746980.6 which is associated with International Application No. PCT/US2013/025452 which is associated with U.S. Appl. No. 13/763,582, dated Jun. 29, 2016, Munich, Germany.
The First Office Action of the the State Intellectual Property Office of People's Republic of China for Chinese Application No. 201380008002.9 which is associated with International Application No. PCT/US2013/025456 which is associated with U.S. Appl. No. 13/763,574, dated Feb. 14, 2016.
The Second Office Action of the the State Intellectual Property Office of People's Republic of China for Chinese Application No. 201380007952.X which is associated with International Application No. PCT/US2013/025458 which is associated with U.S. Appl. No. 13/763,590, dated Mar. 9, 2016.
The Second Office Action of the State Intellectual Property Office of People's Republic of China for Chinese Application No. 2013800080029 which is associated with International Application No. PCT/US2013/025456 which is associated with U.S. Appl. No. 13/763,574, dated Sep. 26, 2016. (Machine translation included).
Extended European Search Report for European Application No. 13746908.6 which is associated with International Application No. PCT/US2013/025452 which is associated with U.S. Appl. No. 13/763,582, dated Oct. 4, 2016, Munich, Germany.
The First Office Action of the European Patent Office for European Application No. 13790956.0 which is associated with International Application No. PCT/US2013/025458 which is associated with U.S. Appl. No. 13/763,590, dated Sep. 15, 2016.

Du Dacheng et al., Design of Autopilot for Small UAV, Computer Measurement & Control, 2010. 18(11), p. 2681-2686, Dec. 31, 2010. (Machine translation included).
Research on Fault Tolerant Pilot Control System of Unmanned Aerial Vehicle, Chinese Master's Theses Full-text database, Engineering Science and Technology II, Dec. 15, 2007, vol. 6, C031-110, Dec. 15, 2007. (Machine translation included).
The Third Office Action of the State Intellectual Property Office of People's Republic of China for Chinese Application No. 201380008002.9 which is associated with International Application No. PCT/US2013/025456 which is associated with U.S. Appl. No. 13/763,574, dated Feb. 13, 2017. (Machine translation included).
The Second Office Action of the State Intellectual Property Office of People's Republic of China for Chinese Application No. 201380007947.9 which is associated with International Application No. PCT/US2013/025452 which is associated with U.S. Appl. No. 13/763,582, dated Mar. 3, 2017. (Machine translation included).
The First Office Action of the Russian Federation for Russian Application No. 2014131912 which is associated with International Application No. PCT/US2013/025458 which is associated with U.S. Appl. No. 13/763,590, dated Mar. 14, 2017. (Machine translation included).
The Second Office Action of the Russian Federation for Russian Application No. 2014131912 which is associated with International Application No. PCT/US2013/025458 which is associated with U.S. Appl. No. 13/763,590, dated Jul. 11, 2017.
The Second Office Action of the European Patent Office for European Application No. 13790956.0 which is associated with International Application No. PCT/US2013/025458 which is associated with U.S. Appl. No. 13/763,590, dated Dec. 14, 2017.
The Third Office Action of the State Intellectual Property Office of People's Republic of China for Chinese Application No. 201380007947.9 which is associated with International Application No. PCT/US2013/025452 which is associated with U.S. Appl. No. 13/763,582, dated Feb. 8, 2018. (Machine translation included).
English translation of the previously cited reference: The Third Office Action of the State Intellectual Property Office of People's Republic of China for Chinese Application No. 201380007947.9 which is associated with International Application No. PCT/US2013/025452 which is associated with U.S. Appl. No. 13/763,582.
The Fourth Office Action of The State Intellectual Property Office of People's Republic of China for Chinese Application No. 201380007947.9 which is associated with International Application No. PCT/US2013/025452 which is associated with U.S. Appl. No. 13/763,582, dated Dec. 5, 2018. (Machine Translation Included).
First Examination Office Action of European Application No. 13787117.4 dated Jul. 17, 2018 which is related to U.S. Appl. No. 13/763,574, filed Feb. 8, 2013.
Google translation of the previously cited Second Office Action of The Russian Federation for Russian Application No. 2014131912 which is associated with International Application No. PCT/US2013/025458 which is associated with U.S. Appl. No. 13/763,590, dated Jul. 11, 2017.
Google translation of the previously cited Third Office Action of The State Intellectual Property Office of People's Republic of China for Chinese Application No. 201380007947.9 which is associated with International Application No. PCT/US2013/025452 which is associated with U.S. Appl. No. 13/763,582, dated Feb. 8, 2018.
Prosecution History of U.S. Appl. No. 15/415,469 as of Sep. 19, 2018.
Summons to Oral Proceedings for European Application No. 13787117.4 on May 6, 2019 which is related to U.S. Appl. No. 13/763,574, filed Feb. 8, 2013.
The First Examination Office Action of the European Patent Office for European Application No. 13746908.6 which is associated with International Application No. PCT/US2013/025452 which is associated with U.S. Appl. No. 13/763,582, dated Mar. 8, 2018.
Bing machine translation of the concurrently cited Fourth Office Action of The State Intellectual Property Office of People's Republic of China for Chinese Application No. 201380007947.9 which is

(56) References Cited

OTHER PUBLICATIONS associated with International Application No. PCT/US2013/025452 which is associated with U.S. Appl. No. 13/763,582, dated Dec. 5, 2018.

* cited by examiner

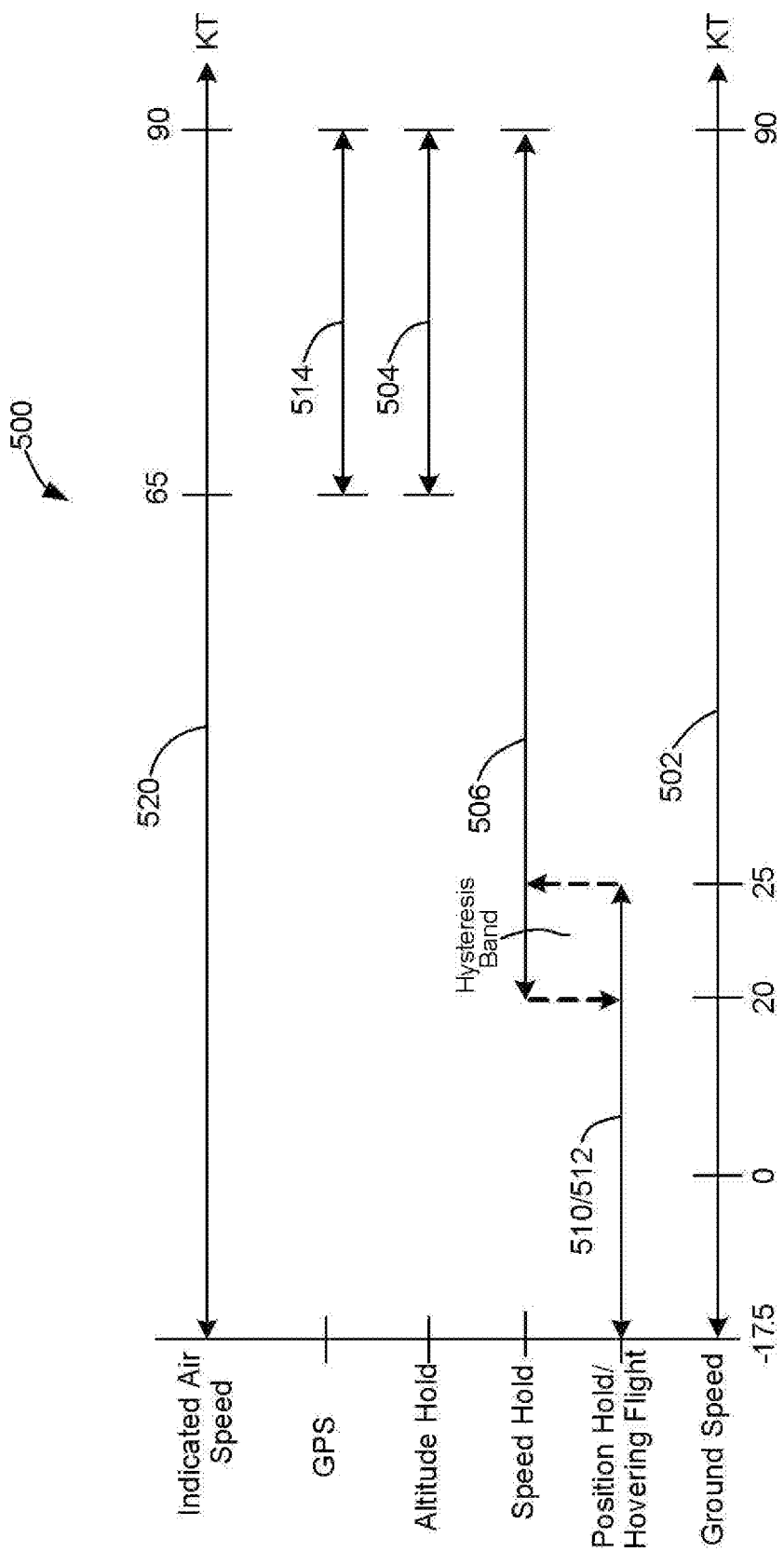

ROTORCRAFT ADVANCED AUTOPILOT CONTROL ARRANGEMENT AND METHODS

RELATED APPLICATIONS

The present application claims priority from U.S. Provisional Patent Application Ser. No. 61/597,555; U.S. Provisional Patent Application Ser. No. 61/597,570; and U.S. Provisional Patent Application Ser. No. 61/597,581, each of which was filed on Feb. 10, 2012 and each of which is hereby incorporated by reference in its entirety.

BACKGROUND

The present application is generally related to flight control systems and, more particularly, to a rotorcraft autopilot and associated methods.

A helicopter is inherently unstable, generally requiring that the pilot maintain a constant interaction with the cyclic control using one hand. Even a momentary release of the cyclic can result in the cyclic or control stick "flopping over", accompanied by a loss of control of the helicopter. This is particularly inconvenient when the pilot has a need to engage in hands-free activities such as, for example, adjusting a headset or referring to a hardcopy of a map. Further, the need to constantly control the cyclic can result in pilot fatigue.

Traditional autopilots can provide benefits which include allowing the pilot to release the cyclic to engage in hands-free tasks, as well as reducing pilot fatigue. Applicants recognize, however, that the cost of a traditional helicopter autopilot can be prohibitive. For example, the cost of a traditional or conventional autopilot can be so significant in comparison to the cost of the helicopter itself that autopilots are uncommon in light helicopters.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Generally, an autopilot system for a helicopter associated components and methods are described. In one aspect of the disclosure, an autopilot system is configured for controlling the flight of a helicopter having a control stick that is operable by the pilot to manually control the flight of the helicopter with the pilot's hand in an engaged position on the control stick. The autopilot system includes a processing section for monitoring the flight of the helicopter and generating control signals responsive to the monitoring. An actuator arrangement receives the control signals to influence the flight of the helicopter in a selected one of a plurality of different flight modes. An input arrangement is located on the control stick such that each flight mode is selectable and controllable with no more than a particular one of the pilot's hands in the engaged position on the stick and without moving the particular hand away from the engaged position while simultaneously controlling the flight of the helicopter.

In another aspect of the disclosure, an autopilot system and associated method are described for controlling the flight of a helicopter having a control stick that is operable by the pilot to manually control the flight of the helicopter with the pilot's hand in an engaged position on the control stick. The autopilot system includes a processing section for monitoring the flight of the helicopter and generating control signals responsive to the monitoring. An actuator arrangement receives the control signals to influence the flight of the helicopter in a selected one of a plurality of different flight modes. An input arrangement is located on the control stick such that each mode is selectable and controllable solely through engaging the input arrangement on the control stick.

In still another aspect of the disclosure, an autopilot system and associated method are described for controlling the flight of a helicopter. The autopilot system includes a sensor arrangement that produces a set of sensor outputs that characterize the flight of the helicopter. A processing arrangement is configured to generate actuator control signals based on the set of sensor outputs to control the flight of the helicopter in a pilot selected one of a plurality of flight modes and to further generate a slaved gyro output signal based on no more than the set of sensor outputs. An autopilot display that is configured to display autopilot flight mode information to the pilot while displaying a slaved gyro output to the pilot based on the slaved gyro output signal.

In yet another aspect of the disclosure, an autopilot system and associated method are described for controlling the flight of a helicopter. The autopilot system includes a processing arrangement that is configured to determine a flight status of the helicopter based on a plurality of sensor inputs for operating the helicopter in a selected one of a plurality of flight modes and to provide for a pilot selection of one of a subset of one or more but less than all of the plurality of flight modes which subset is customized for pilot selection based on a current flight status of the helicopter.

In a continuing aspect of the disclosure, an autopilot is described for use with a helicopter including a rotor system having a cyclic control to control the flight of the helicopter and which helicopter at least generates a Low RPM signal that is indicative of a threshold low rotational speed of the rotor. The autopilot includes a sensor arrangement that produces a set of sensor outputs that characterize the flight of the helicopter. An actuator arrangement is configured for moving the cyclic control responsive to one or more cyclic control signals. A control arrangement is configured for receiving an activation signal that is at least in part based on the Low RPM signal and the sensor outputs, and for responding to the activation signal by automatically activating an emergency descent mode to generate the cyclic control signals responsive to the sensor outputs to manage the cyclic control without control inputs from a pilot at least during an initial portion of the descent at least to pitch the helicopter in a way that initially establishes a forward speed of the helicopter that is within a predetermined range of speed irrespective of a given forward speed at a time when the activation signal occurred.

BRIEF DESCRIPTION OF THE DRAWINGS

Embodiments are illustrated in referenced figures of the drawings. It is intended that the embodiments and figures disclosed herein are to be illustrative rather than limiting.

FIG. 5 is a diagrammatic chart that illustrates autopilot speed bands for a plurality of autopilot control modes.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents. It is noted that the drawings may not be to scale and may be diagrammatic in nature in a way that is thought to best illustrate features of interest. Descriptive terminology may be adopted for purposes of enhancing the reader's understanding, with respect to the various views provided in the figures, and is in no way intended as being limiting.

Figure 1:
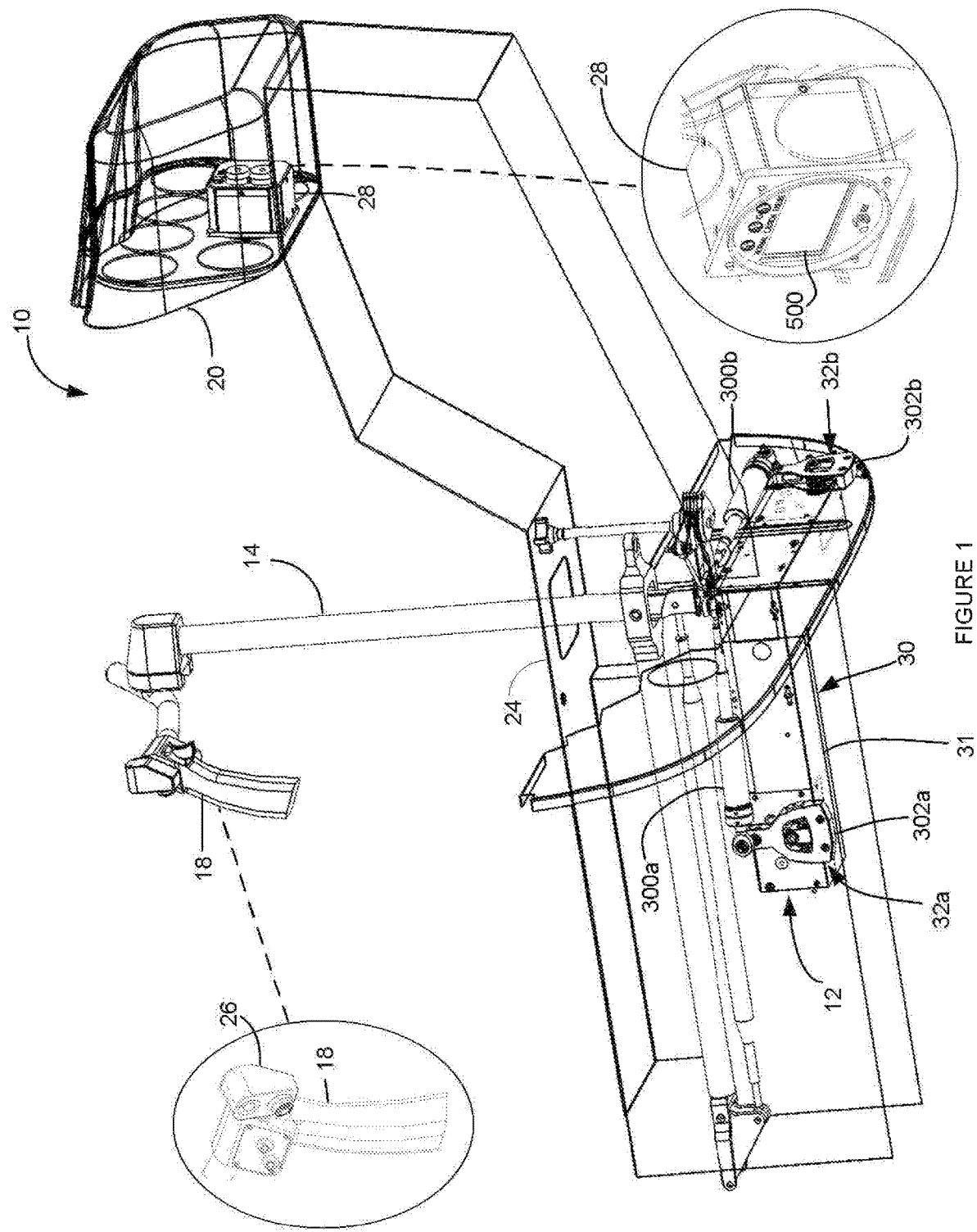
FIG. 1 is a diagrammatic perspective, partial view of a helicopter including components of an autopilot according to the present disclosure.

FIG. 1 is a perspective, partial view of various components of a helicopter 10, shown here for purposes of illustrating various components of an embodiment of an autopilot system 12 in relation to the helicopter. It should be appreciated that much of the physical structure of the helicopter itself has been rendered as invisible in FIG. 1 for purposes of illustrative clarity, however, it is understood that this structure is present. The autopilot of the present disclosure is electromechanical and can provide flight control of a helicopter without requiring a hydraulic flight control system. The helicopter can be, by way of non-limiting example, a Robinson R22 helicopter. The teachings that are brought to light herein, however, can readily be adapted for use with any suitable helicopter, either currently available or yet to be developed. For example, the autopilot of the present disclosure can be used with helicopters having hydraulic cyclic assistance, as will be further described below.

Helicopter 10 includes a stick or cyclic 14 having a control grip or handle 18 that is configured for engagement with the hand of a pilot. As will be appreciated by one of ordinary skill in the art, stick 14 can be moved fore and aft (toward and away from an instrument console 20) to control pitch of the helicopter and transversely for purposes of controlling roll of the helicopter in a coordinated manner to produce controlled flight. Additional control inputs are provided by the pilot via a pair of pedals in order to control the yaw orientation of the helicopter by changing the pitch of a tail rotor. It is noted that these yaw orientation control components have not been shown for purposes of illustrative clarity but are understood to be present. Further, the pilot likewise remains in control of the collective of the helicopter as well as the throttle settings. The autopilot of the present disclosure, however, can exert full control authority over stick 14 by moving the stick in any direction to limits of its travel under appropriate circumstances. Stick 14 passes below a deck 24 of the helicopter and engages pitch and roll linkages of the helicopter in a manner that is familiar to one of ordinary skill in the art so as to control cyclic actuation of the main rotor of the helicopter. The term "cyclic" refers to the variation in pitch of the rotor blades of the helicopter on a per rotation basis. In this regard, cyclic control can refer to manipulation of the stick or the stick itself can be referred to as the cyclic. An autopilot display processor unit (ADPU) 28, best seen in an inset view, can be mounted in instrument console 20 to provide indications to the pilot as well as to provide processing capability and other capabilities, as will be further described.

Still referring to FIG. 1, autopilot 12 implements cyclic control through a number of component assemblies that are appropriately located on the helicopter. A main autopilot unit 30 is located below the main deck of the helicopter. In the present embodiment, main unit 30 includes an L-shaped enclosure 31 that supports electronics as well as a pitch control linkage 32a and a roll control actuator linkage 32b, which may be referred to generally or collectively by the reference number 32. Each of these linkages includes an actuator that is located within the main unit enclosure, as will be further described. A distal end of each of the linkages engages the lowermost end of stick 14 to implement what is known as a parallel control system. In this regard, it should be appreciated that the original cyclic control linkages of helicopter 10 between stick 14 and the rotor remain intact. That is, inputs from the helicopter pilot as well as the autopilot are input directly to the stick. Details, yet to be described, with respect to the pitch and roll control linkages provide for a parallel control input arrangement. A series type autopilot control system, in contrast, requires breaking the original cyclic control linkages of the helicopter between the stick and rotor such that the autopilot actuators can be inserted into the break. It should be appreciated that the teachings herein can readily be adapted to a series control input embodiment. Autopilot 12 further includes a switch module assembly 26 that is shown in a subsequent, further enlarged view and will be described in detail below.

Figure 2:
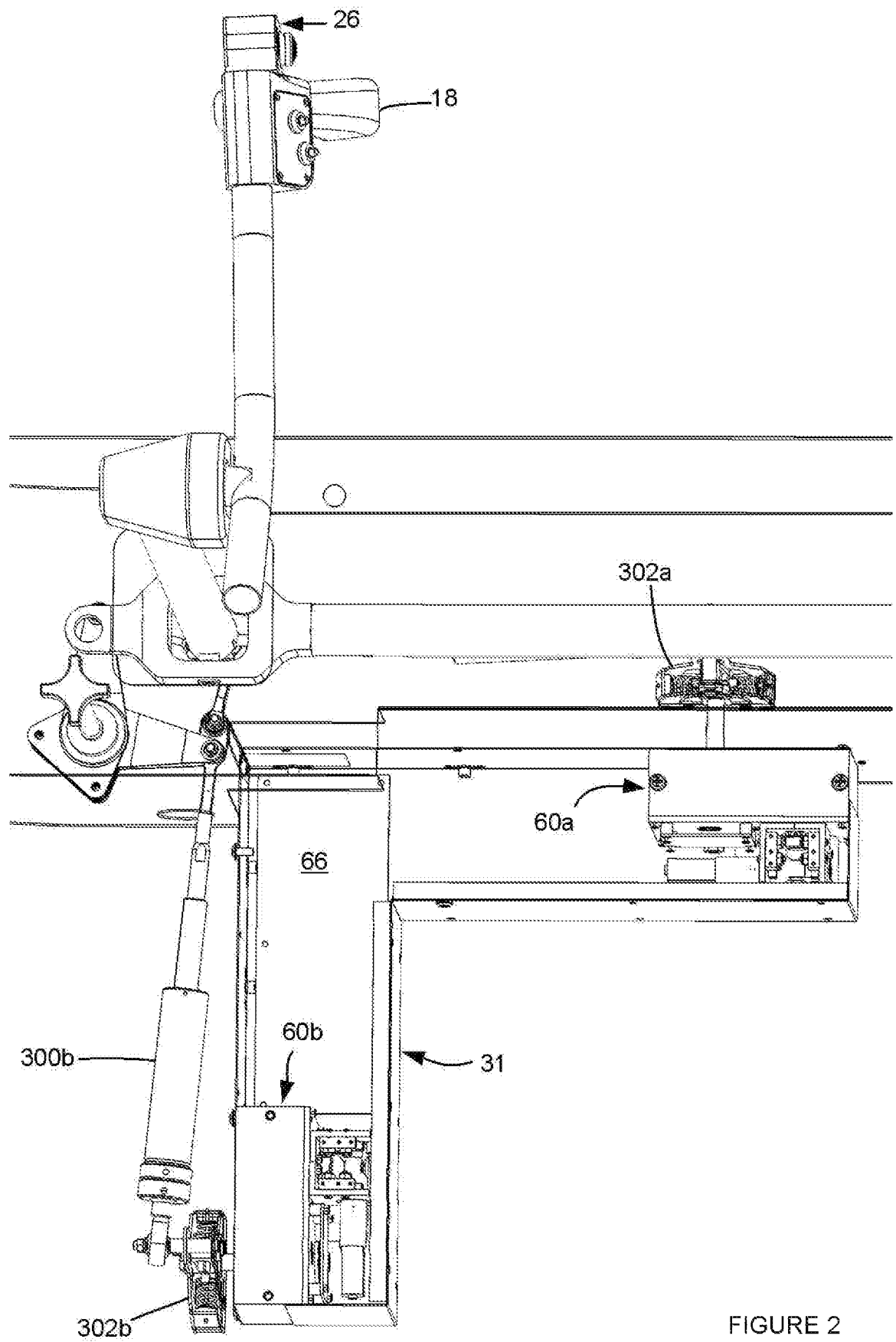
FIG. 2 is an overhead diagrammatic perspective, partial view of the helicopter of FIG. 1, shown here to illustrate further details with respect to components of the autopilot system.

Turning to FIG. 2, components of the helicopter and autopilot are shown in an overhead perspective view. In this view, a pitch actuator 60a and a roll actuator 60b (which may be referred to generally or collectively by the reference number 60) can be seen within L-shaped enclosure 31 with the lid of the enclosure rendered transparent. Main unit electronics 66 are located within the enclosure and are suitably electrically interfaced (not shown) to stick 18 including switch module assembly 26 and to the actuators.

Figure 3:
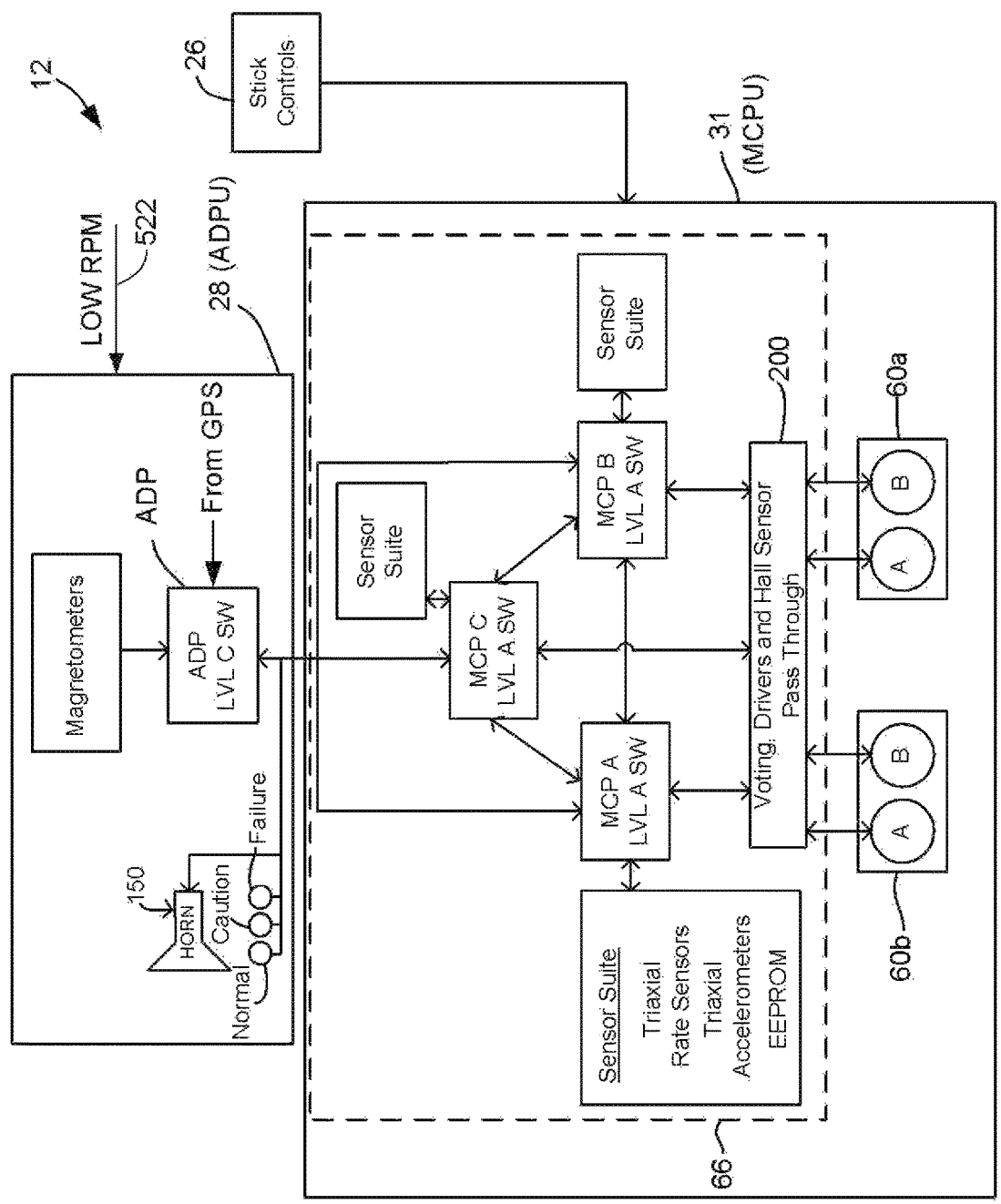
FIG. 3 is a block diagram that illustrates an embodiment of the autopilot of the present disclosure.

Having described the mechanical components of the autopilot in detail above, it is now appropriate to describe the autopilot in terms of the relationship between the afore-described components and related control electronics. In particular, FIG. 3 is an embodiment of a block diagram of autopilot 12. In this regard, main unit 30 comprising enclosure 31, pitch and roll actuators 60 and electronics 66 may be referred to hereinafter as the Motor Control Processor Unit (MCPU) or main autopilot unit 30. The MCPU includes three microprocessors, each of which may be referred to as a Motor Control Processor (MCP) or triplex processor. There are three MCPs, individually designated as MCP A, MCP B and MCP C. These processor units each access a sensor suite of tri-axial MEMS rate sensors and tri-axial MEMS accelerometers. In the present embodiment, each of these sensor suites is identically configured. The MCPs are used to provide an inner loop of an overall control system having an inner loop and an outer loop. The MCPs provide commands to brushless DC motors, Motor A and Motor B of pitch actuator 60a and roll actuator 60b, driving the control system for the helicopter. All inter-processor communication can be through a serial bus that is natively supplied on each of the processors. Data integrity can be protected through the use of a cyclic redundancy check (CRC) incorporated into the data stream.

The Federal Aviation Administration certifies airborne system software under a version of DO-178. At the time of this writing, DO-178C has been released. This document specifies Design Assurance Levels (DALs) based on the criticality of software failure in a given system. For example, DAL A is designated as "catastrophic" and is assigned where a failure may cause a crash. As another example, DAL C is designated as "major" and is assigned where a failure is significant and may lead to passenger discomfort or increased crew workload. In the present embodiment, each one of the three MCPs can execute identical DAL A software to constitute a triple-redundant system. The motor control processors are interconnected so that they can share data. Each processor reads its sensor suite and compares its data with sensor data coming from the other two processors for purposes of consistency and each motor control processor computes averages of all the corresponding sensors to use for further processing. In another embodiment, median values can be determined, as opposed to averages. Sensor data determined to be erroneous based on the median is eliminated from influencing the mean. Generally, detection of a failure of a sensor (as opposed to the presence of random noise) can be accomplished by subjecting sensor data from each of the three sensor suites to low-pass filtering to remove noise. The filtered outputs are compared against one another for consistency, if one of the filtered results is significantly different (e.g., outside of a predetermined threshold) from the other two results, the sensor associated with the data can be declared to have failed. Rate gyro failure detection can be accomplished in a similar fashion with the additional step of passing the gyro data through wash-out filters prior to the low-pass filters in order to remove bias or drift effects. Once processed through the two filters, the gyro data outputs can be compared against one another for consistency, and any gyro producing an outlying value can be declared to have failed. A warning signal of sound and light can be sent to autopilot display processor unit (ADPU) 28 on instrument panel 20 (FIG. 1). Haptic feedback such as, for example, stick shaking can be used alone or in combination with other warning signal indications. In an embodiment, an annunciation section 150 can include status lights, best seen in the enlarged inset view of the ADPU in FIG. 1, include green (normal), amber (caution) and red (failure), as well as dual warning horns to provide system status indications. The warning horns also provide system status notifications and alarms along with the status lights. Both the status lights and horns interface directly to the MCPs. In some embodiments, sounds and/or warnings can be transmitted over the helicopter audio system such that notifications can be heard in the pilot's headset as well as being issued from the ADPU. Complementing the status lights and horns is a display which provides current autopilot mode settings such as engagement status, track, altitude, slaved gyroscopic heading, speed over ground and any warning messages. Also on the panel is a testing button which initiates an Initiated Built-In Test (IBIT).

Autopilot 12 can be configured to generate actuator control signals based on the set of sensor signals that is used by the MCPs to control the flight of the helicopter in a pilot-selected one of a plurality of flight modes. The MCPs can further generate a slaved gyro output signal based on no more than the same set of sensor outputs. As will be seen, an autopilot display can be configured to display autopilot flight mode information to the pilot while displaying a slaved gyro output to the pilot based on the slaved gyro output signal. The autopilot display can be provided on a single screen, although this is not required, that simultaneously displays the autopilot flight mode information and the slaved gyro output. In one embodiment for producing the slaved gyro output, the sensor arrangement includes a yaw rate gyro that produces a yaw rate output. The MCPs are configured to integrate the yaw rate output to produce a yaw heading. Because the yaw rate gyro exhibits significant drift, especially when a MEMS rate sensor is used and the single yaw sensor does not detect the true yaw rate in a banked turn, the MCPs periodically update the yaw heading to compensate for the yaw rate drift and errors. In an embodiment, the sensor arrangement includes a GPS that produces a GPS heading and the processing arrangement periodically updates the yaw heading based on the GPS heading. In another embodiment, the sensor arrangement includes a magnetometer arrangement that produces a magnetic heading signal and the processing arrangement periodically updates the yaw heading based on the magnetic signal heading.

In another embodiment for producing the slaved gyro output, the sensor arrangement includes a triaxial rate gyro and a triaxial accelerometer and the processing arrangement is configured to generate a helicopter attitude including a yaw heading. The attitude can be determined by an inner control loop of the autopilot on an essentially instantaneous basis using the set of sensor outputs. In one embodiment, attitude can be monitored or tracked by the inner loop based on integration of the outputs of rate sensors. In another embodiment, the inner loop can determine the helicopter attitude based on a direction cosine matrix. The latter can be referred to interchangeably as a rotation matrix that characterizes one frame of reference relative to another frame of reference in terms of a rotation. Rate sensor gyro inputs are used as an integration input to determine the attitude of the helicopter. In this regard, all determinations can be made in terms of vector cross products and dot products. In either case, since the determined yaw heading is subject to a yaw rate drift that is exhibited by the triaxial rate gyros, the processing arrangement is configured to at least periodically adjust the yaw heading to compensate for the yaw rate drift and produce the slaved gyro output. The yaw heading can be periodically updated based on either magnetic heading or GPS heading.

In conjunction with an embodiment of the inner control loop that determines the attitude of the helicopter, it should be appreciated that a roll-pitch attitude sensor or artificial horizon can be displayed using no more than the sensors that are employed by the autopilot. Such an artificial horizon typically illustrates roll orientation in a well-known manner based on tilting a horizon line on a display in conjunction with illustrating pitch orientation by moving the horizon line vertically on the display. Pitching the nose of the helicopter upward typically vertically lowers the horizon line while pitching the nose downward typically raises the horizon line. In an embodiment, display 500 can display the artificial horizon without displaying the slaved gyro. In another embodiment, both the slaved gyro and artificial horizon can be displayed when suitable display space is available. Of course, the artificial horizon can be displayed on a separate display screen in an embodiment. In some embodiments, the autopilot display can switch between the slaved gyro display and the artificial horizon display. By way of non-limiting example, the autopilot display can automatically switch to the artificial horizon, for example, if an unusual attitude of the helicopter is detected such as would occur in an emergency.

The MCPs can also read Hall sensor data from the actuator motors, which can be used to indicate the current position of each actuator, and a command signal coming from an autopilot display processor (ADP) which forms part of the ADPU. In this regard, the ADPU serves as the outer control loop to provide command signals to the inner loop. Using all these data, each MCP calculates a control signal for the motors in terms of a PWM (Pulse Width Modulation) and direction of rotation. Each processor also uses the Hall sensor data to control the power connections to the armature of the brushless motors assigned to it. Each MCP compares its PWM command signal and rotation direction for the pitch and roll actuators with commands generated by the other two MCPs for agreement. Since all processors are using the same data to compute motor commands, they should produce identical output signals. Signals for agreement/disagreement with the other two processors are sent to a voting section 200 that will disable control input capability of any MCP that is in disagreement with the other two MCPs.

Each actuator includes motor A and motor B. Each individual motor is controlled by one MCP. Thus, only MCP A and MCP B control motors. In particular, MCP A controls motor A in each of pitch actuator 60*a* and roll actuator 60*b*, while MCP B controls motor B in each of pitch actuator 60*a* and roll actuator 60*b*. MCP C (the third processor) does not control a motor but performs all calculations to generate stick commands as if it were controlling a motor. For example, if MCP A and MCP C agree on the control of the pitch motor, but MCP B does not, then MCP B will be voted out from control of its pitch motor, MCP B will still control its roll motor unless MCP A and MCP C also vote out control of that motor. On the other hand, if MCP C is voted out, no actuator motors will be affected, but a warning light and horn can be actuated as would be the case for the MCPs which control motors.

The actuators are designed such that either one of motor A or motor B is independently capable of driving the actuator to control the helicopter. The output shaft of a failed motor will be rotated by the remaining motor. If one of MCP A or MCP B is voted out, the autopilot can continue to function despite the fact that each of these MCPs controls motors. As stated, there can be a warning light and a brief sounding of the horn to notify the pilot that there has been a non-critical autopilot malfunction.

The MCPs have full authority over the controls and are rate limited only by the natural response of the system which is about 5 inches per second. The MCP control section or inner loop is the only portion of the autopilot that can create a critical or major hazard malfunction at least in part due to the speed of the stick motion. Accordingly, the MCPU is designed as triple-redundant with DAL A designated software for purposes of operating the inner loop of the autopilot. These factors greatly reduce the probability of a critical failure. Applicants recognize, however, that the software corresponding to the outer loop can be partitioned from the inner loop software in a way that allows the outer loop software to be designated at a lower DAL C certification. The outer loop software is handled by the ADP (Autopilot Display Processor) in ADPU 28. The MCPs convert requested autopilot commands from the ADP into actuator control signals that can drive the actuator motors within defined operational limits. In this regard, it should be appreciated that DAL A software is handled by the triple redundant MCPs while DAL C, outer loop software is handled by a completely different processor. By way of still further explanation, a single executable runs on each MCP. The MCPs, which may be referred to as the triplex processors, can execute identical software. Thus, the autopilot control laws are partitioned between the ADP and triplex processors. The ADP processes the outer loop dynamics and autopilot modes while the triplex MCPs process the inner loop dynamics. Outer loop control laws relate to navigation functions while inner loop control laws relate to attitude control on an essentially instantaneous basis. The ADP further provides the pilot's graphical and testing interface to the autopilot and executes the autopilot control laws to determine actuator commands based on sensor and GPS data. Accordingly, this processor interfaces directly with the GPS and triaxial magnetometers, and indirectly with triaxial accelerometers and triaxial rate gyros of the MCPs which provide the yaw, roll-pitch attitude, position, altitude, ground speed, track and heading data. The ADP monitors the health of these sensors but does not check the validity of the data. The IBIT test switch also interfaces to the ADP.

The MCPs accept data from the ADP which can include commands as well as data from an external GPS. The data can be screened by each MCP to detect errors or malfunctions. The control command is rate-displacement limited by the MCPs. The MCPs will not allow a command from the ADP to create a hazardous response from the helicopter. GPS data is used in both the MCP and ADP. The GPS and magnetometer data are both used in the MCPs to remove drift errors associated with the rate sensors of each sensor suite and to determine roll, pitch and heading. The GPS data can also be checked for errors.

The MCPs constantly monitor for both internal and external faults. In the event of an ADP failure, any one MCP can immediately recognize the situation based on update rate and control signal conformity. In response, the MCPU, in one embodiment, will then cause the inner loop to hold the helicopter straight and level. In another embodiment, the MCPU can act in the manner of a SAS (Stability Augmentation System) and control the helicopter based on internal rate signals. The MCPs will attempt to hold attitude and also actuate a horn and light to indicate a failure. It has been empirically demonstrated that the helicopter can maintain prolonged flight with only MCP control, providing more than ample time for the pilot to take control and disengage the autopilot. The ability to detect excessive autopilot response resides in the triplex motor controllers. The triplex processors monitor sensors and also check to confirm that calculated responses are within limits. Pitch and roll commands from the ADP are limited based on such command filtering by each of the triplex processors. Each triplex processor can detect whether a limit has been exceeded and can initiate safe shut down of the autopilot. Pitch and roll axes commands can be monitored identically but with different limit values. The monitors are dynamic; that is, the limit values can be frequency/rate dependent. Redundancy management features for each axis can include stick rate limiting and body rate monitoring.

Each MCP processor can be provided with an independent power supply. A total power failure of the helicopter's power system can cause the actuators to lock in position for about five seconds using a dynamic braking feature that is described in a separate patent application. This five second time period is sufficient for the pilot to take over control. In this regard, the autopilot does not let the cyclic stick flop over by releasing control responsive to a power failure. Even though the actuators are locked, however, the pilot can still perform control over the helicopter since there are override or force limited links 300a (pitch, seen in FIG. 1) and 300b (roll, seen in FIGS. 1 and 2) between each actuator and the cyclic stick. These links are rigid for forces below an unseating or breakaway value and compliant at higher forces to allow the pilot to safely maneuver and land the helicopter even if disengagement of the system cannot be achieved. It has been empirically demonstrated that a pilot can control the helicopter, including hovering and landing, with both actuators in what is referred to as a "locked" state. The locked state is provided by shorting all windings of the actuator motors and is used in a dynamic braking embodiment described in copending U.S. application Ser. No. 13/763,574 which is incorporated herein by reference. The override links are described in detail in a separate patent application. In a helicopter that does not utilize a hydraulic interface to the cyclic, cyclic vibration isolators 302a (pitch) and 302b (roll) can be located on the output shaft of each actuator. The vibration isolators may be optional for use with a helicopter having hydraulic cyclic control since the hydraulic system generally provides damping of cyclic oscillations. The vibration isolators reduce the two per revolution oscillating motion, that is present in the R22 rotorcraft control linkage and other light helicopters, to prevent vibratory loads on the rotorcraft control and to increase the fatigue life of the actuator components. The cyclic vibration isolators are described in detail in a separate patent application.

The sensor suite of each MCP can also include memory such as, for example, EEPROM or other suitable memory. If there is an error detected by an MCP during operation, the error code can be stored in the EEPROM of the sensor suite associated with the MCP. The EEPROM can later be read in the context of determining the cause of failure. The EEPROMs can also contain parameters specific to the model of the helicopter in which the autopilot is installed such as, for example, control loop constants and sensor offsets.

Figure 4:
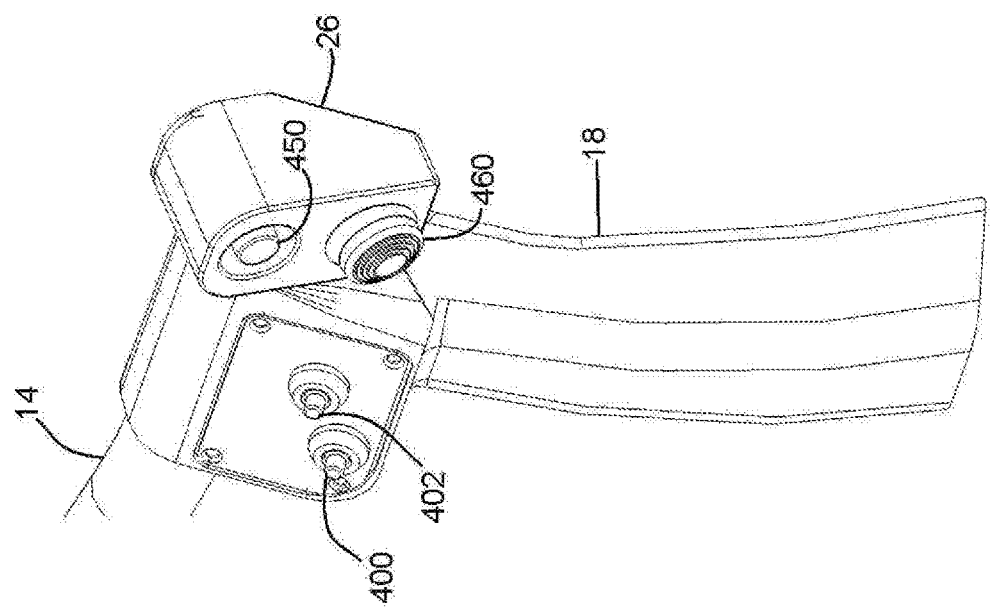
FIG. 4 is a diagrammatic further enlarged perspective view of an embodiment of a cyclic grip according to the present disclosure including a switch module assembly that is accessible for pilot control using the hand that is controlling the grip.

Referring to FIG. 4, cyclic handle 18 is illustrated in a further enlarged perspective view. Switches 400 and 402 allow the pilot to selectively change frequencies on a factory installed nav-com unit (not shown). Switch 400 changes the communications frequency while switch 402 changes the navigational frequency. Such a radio unit allows the pilot to program a new frequency into a stand-by channel for nav and com. By pressing the appropriate switch, the active and stand-by frequencies are interchanged. The pilot can then choose to reprogram the stand-by frequency or save the old frequency if he/she chooses to return to it. Cyclic handle 18 further includes aforementioned Switch Module Assembly 26 having an engage/disengage switch 450 and a trim switch 460. The latter may be referred to interchangeably as a "top-hat" switch due to the physical appearance of the switch. Electrical cabling to the switch module assembly can be co-routed through the cyclic along with existing cables. As seen in FIG. 3, the components of switch module 26 are electrically connected to the MCPU for monitoring by the MCPs. Actuating switch 450 toggles the autopilot to engage if it is currently disengaged or, conversely, to disengage if it is currently engaged. Top-hat switch 460 includes four sets of contacts that can be referred to as left, right, up and down in the view of the figure which respond in the matter of a joystick to lateral manipulation of the top-hat button of the switch. A fifth function is actuatable responsive to depressing the top-hat switch directly inward. This action will cause more than one and up to all four of the four switches to be actuated. The top hat switch serves as a trim switch due to its behavior in certain flight modes of the helicopter. For example, in one mode of operation, the switch, when pushed up, in the view of FIG. 4, causes the helicopter to descend while pulling the switch down causes ascent. In the same mode, pushing switch 460 to the right causes a turn of the helicopter to the right while pushing to the left causes a turn to the left. In a hover mode, up/down and left/right actuations cause respective increases in velocity fore/aft and left/right. Pushing or depressing the switch straight in to actuate the multiple trim switches can cause the autopilot to select operational modes such as, for example, switching from a speed/track hold mode to an altitude/track hold mode. In an embodiment, depressing the top hat switch brings up a mode select menu. Lateral selection of individual switches then allows for navigation on the menu. Depressing the top hat switch with a particular mode or item highlighted will select that particular mode or item. Once a given mode has been selected, left/right and up/down actuations can fine tune the flight parameters that are associated with the given mode.

Referring to FIG. 1 and by way of non-limiting example, autopilot 12 can have at least six normal modes of operation which will be described in detail below. Available modes can be dependent on the current rotorcraft ground speed (GS) and/or airspeed, and can be displayed on a screen 500 of Autopilot Display Panel 28. Some modes are entered upon engaging the system while the remaining modes can be selected through top-hat switch 460 (FIG. 4).

Attention is now directed to FIG. 5 which is a diagrammatic chart, generally indicated by the reference number 500, of rotorcraft groundspeed (and/or airspeed) 502, in knots, in relation to a plurality of autopilot flight modes including altitude hold 504, speed hold 506, position hold 510, hovering flight 512 and GPS mode 514. It is noted that the speed band for the altitude hold mode and GPS mode are identical in the present embodiment. Indicated airspeed 520 is also shown (in knots) but is assumed to correspond to ground speed 502 for purposes of the present example, however, there is no constraint imposed in that regard. The availability of any particular one of the modes is designated using double-headed arrows to represent corresponding speed bands that are shown offset from ground speed 502 for illustrative purposes. In some embodiments, mode speed bands can be made available responsive to indicated airspeed which can be significantly different than ground speed that can be GPS based. It is noted that, while the position hold and hovering flight modes differ in their specific flight behavior, they can correspond in appearance at least insofar as their speed bands. It should be appreciated that the endpoints of the various speed bands are shown only by way of example and that these endpoints can be moved to suit a particular installation or model of helicopter. Altitude hold mode 504 operates on the front-side of the power curve with speed band endpoints that depend on the particular helicopter. Using the R22, by way of non-limiting example, front-side power curve speed band endpoints can range, for example, from approximately 65 knots (the minimum drag point on the power curve) up to approximately 90. In this regard, the actual lower limit of the front-side of the power curve, for the R22, is approximately 53 knots indicated airspeed with the value of 65 knots selected for purposes of providing a safety margin. For high wind speeds, the pilot must look at the helicopter's airspeed indicator to verify that the airspeed limits are not exceeded. Similarly, the actual upper limit is 104 knots such that the selection of 90 knots provides an additional safety margin. Speed hold mode 506 operates in a band having speed band endpoints at a lower limit of 20 knots to an upper limit of 90 knots. In this regard, the portion of the speed hold mode ranging from 25 knots down to 20 knots is only available when reducing speed in the speed hold mode from an initial speed of 25 knots or more, as will be further described. In each of position hold mode 510 and hovering flight mode 512, a corresponding band of available ground speed ranges from −17.5 knots (backwards) up to 25 knots. It should be appreciated that the objective in the position hold mode is to hover at zero speed above a selected position. The association of speed band 510 with the position hold mode indicates that the position hold mode is available for selection within this speed band. Once selected, however, the autopilot attempts to hold zero ground speed over a given geographic position, for example, at the time the selection was made. In the hovering flight mode, the pilot can select any speed within speed band 512 for operation such that the helicopter transitions over the ground at the selected hovering speed, including, at least approximately, zero speed. GPS modes are configured for operation in speed band 514, corresponding to the altitude hold speed band, so that altitude can be maintained while traveling along the programmed course over the ground that extends between defined geographic points.

Still referring to FIG. 5, at 20 knots with reducing speed, the autopilot automatically transfers from speed hold mode 506 to hovering flight mode 512. Conversely, starting in position hold mode 510 or hovering flight mode 512, increasing speed to a value that exceeds 25 knots results in automatically entering speed hold mode 506. Thus, a hysteresis band is present with respect to switching between position hold/hovering modes and the speed hold mode such that mode switching cannot oscillate. That is, while in the hysteresis band, the available mode or modes of operation depend on which mode was active upon entering the band. Below 20 knots ground speed, both hovering flight mode 510 and position hold mode 512 are available. In both position hold mode and hover flight mode, the autopilot can fly backwards to maintain the current settings. Further details will be presented immediately hereinafter with respect to the various modes, in conjunction with the presentation of a series of screen shots.

Certain autopilot modes can be automatically activated. For example, an attitude recovery mode can be initiated responsive to engaging the autopilot. This automatic response is based on the attitude at the time of engagement. If the helicopter is found to be in an unusual attitude at the time of engagement, the autopilot brings the helicopter to straight and level flight. An artificial horizon can be displayed in conjunction with the attitude recovery mode, as described above.

As another example, an autorotation mode can be automatically activated, for instance, when the main rotor speed drops below 97% of normal. It should be appreciated that the specific activation RPM or percent of normal RPM can be customized based on the particular helicopter in which the autopilot is installed. For this purpose, ADPU 28, as seen in FIG. 3, can receive a low RPM signal 522 as an activation signal. In an embodiment, the autorotation mode cannot be explicitly deselected by the pilot but can be deactivated, for example, by the pilot overriding the engine governor to reduce the throttle. Embodiments of the autorotation mode can cooperate with the emergency collective actuator that is described in U.S. patent application Ser. No. 13/479,130 (hereinafter, the '130 application) which is commonly owned with the present application and hereby incorporated by reference. For example and with reference to FIG. 15 of the '130 application, output 422 of an AND gate 312 can be used as an activation signal, as opposed to the low RPM signal. Moreover, there is no need to reactivate the emergency collective actuator if the collective has already been pulled down by the emergency collective actuator or lowered by the pilot, and the helicopter is already in autorotation. Insofar as the operation of the autorotation mode, if the pilot has properly setup the autorotation and the rotor speed is returning to normal, the autorotation mode does not apply any changes to aircraft pitch.

Figure 6A:
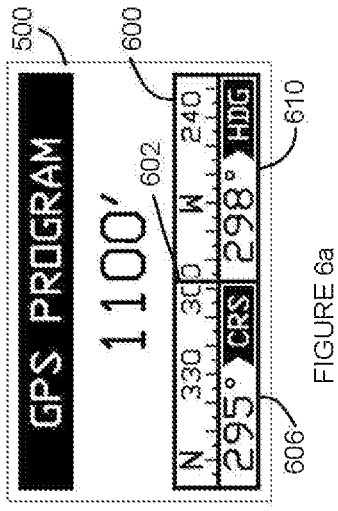
FIGS. 6a and 6b are screen shots which illustrate embodiments of the appearance of a display screen in a GPS Program mode.
Figure 6B:
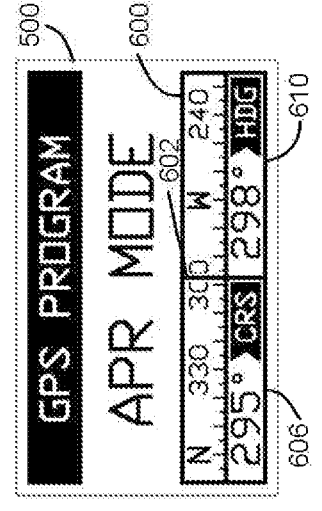

Referring to FIGS. 6a and 6b, an embodiment of the appearance of screen 500 in a GPS Program mode is illustrated. Initially, it is noted that each of the flight mode and menu displays described herein can include a navigation portion having a heading bar 600 including a centerline 602 that indicates the current heading of the helicopter. In an embodiment, the heading bar can be generated based on the output of a slaved gyro. The heading is the direction the helicopter is pointed, usually referenced to magnetic north. Below heading bar 600, a course indicator 606 and a heading indicator 610 can be provided. In the present example, heading bar 600 as well as heading indicator 610 show a heading, HDG, of 298 degrees while course indicator 606 shows a course, CRS, of 295 degrees. In the GPS Program mode, the CRS indicates the angle over the ground that is associated with a path segment defined between two GPS points. It should be appreciated that the 2 degree difference between the CRS and HDG indications can be attributed, for example, to a cross-wind. FIG. 6a illustrates an embodiment of the appearance of display 500 during the GPS mode, for example, during a segment of a GPS programmed path that is defined to hold an altitude of 1100 feet. FIG. 6b illustrates the appearance of display 500 during a programmed GPS approach wherein the display indicates "APR MODE" which represents Approach Mode, for example, to an airport. During the approach mode, the rate of descent is controlled to follow some vertical course either enroute or for approach to an airport.

Figure 7A:
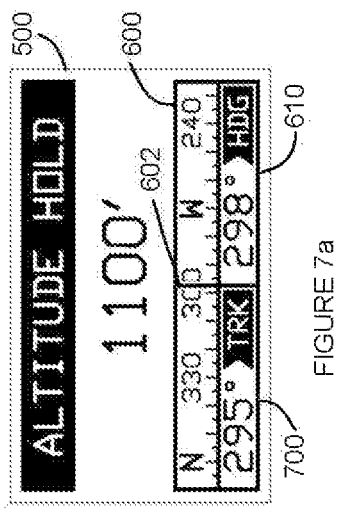
FIGS. 7a and 7b are screen shots which illustrate embodiments of the appearance of a display screen in an Altitude Hold mode.
Figure 7B:
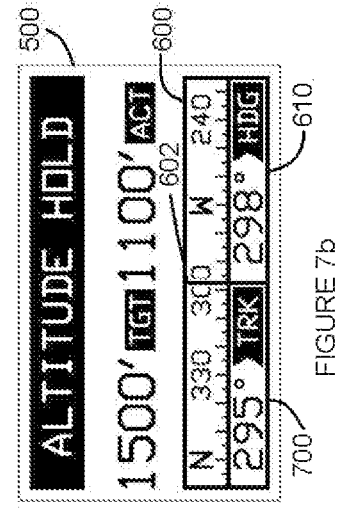

Turning to FIGS. 7a and 7b, embodiments of the appearance of display 500 in the altitude hold mode are illustrated.

In this example, it should be appreciated that CRS indication 606 of FIGS. 6a and 6b has been replaced by a track, TRK, indication 700. The latter indicates the angle that the helicopter is moving over the ground and differs from the heading which is the angle the helicopter is pointing, usually referenced to magnetic north. It is noted that the heading can vary with respect to the course or track indication responsive to crosswinds. FIG. 7a illustrates an embodiment of the appearance of display 500 during the altitude hold mode at a time when the autopilot is set to maintain an altitude of 1100 feet and that altitude is the current altitude of the helicopter. FIG. 7b illustrates an embodiment of the appearance of display 500 during the altitude hold mode at a time when the helicopter is currently at an altitude of 1100 feet, which shown as actual, ACT, altitude but the pilot has actuated top hat switch 460 (FIG. 4) to set a target, TGT, altitude of 1500 feet such that the autopilot will then cause the helicopter to climb to 1500 feet. This mode is dependent on the power curve and is thus restricted to airspeeds above 65 knots indicated airspeed. The mode can also be restricted to indicated airspeeds below a maximum indicated airspeed which is 90 knots in the present example. As discussed above, both the lower and upper limits of the altitude hold speed band can be changed based upon installation in a particular helicopter. In the altitude hold mode, actuating trim switch 460 up or down results in a corresponding increase or decrease in altitude whereas the trim functions right/left result in a track, TRK adjustment.

Figure 8A:
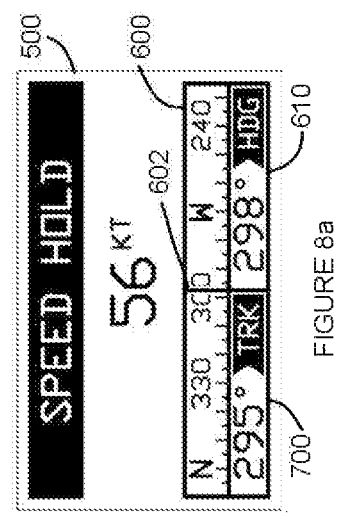
FIGS. 8a and 8b are screen shots which illustrate embodiments of the appearance of a display screen in a Speed Hold mode.
Figure 8B:
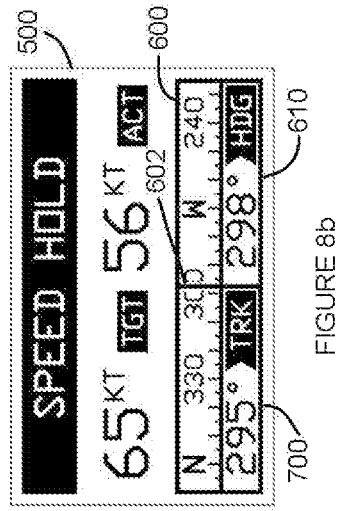

FIGS. 8a and 8b illustrate embodiments of the appearance of display 500 in the speed hold mode. FIG. 8a illustrates an embodiment of the appearance of display 500 during the speed hold mode at a time when the autopilot is set to maintain a speed of 56 knots and the current speed of the helicopter matches 56 knots. FIG. 8b illustrates an embodiment of the appearance of display 500 during the speed hold mode at a time when the actual (ACT) speed of the helicopter is 56 knots but the pilot has actuated top hat switch 460 (FIG. 4) to set a target, TGT, speed of 65 knots such that the autopilot will then pitch the helicopter forward to increase speed to 65 knots. As is evident based on FIG. 8b, the pilot can trim the target speed and track values using top-hat/trim switch 460. Holding the trim switch 460 up or down results in a corresponding increase or decrease in groundspeed, whereas holding trim switch 460 right or left results in a corresponding increase or decrease in the track angle.

Figure 9:
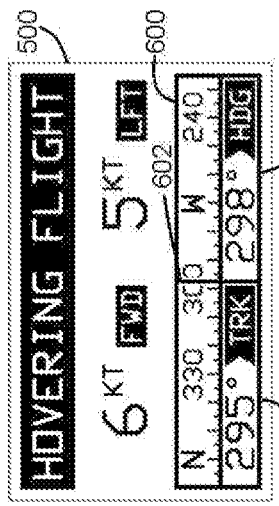
FIG. 9 is a screen shot which illustrates an embodiment of the appearance of a display screen in a Hovering Flight mode.

FIG. 9 illustrates an embodiment of the appearance of display 500 in the hovering flight mode which is available up to 25 knots so long as the mode is entered below 20 knots, as shown in FIG. 5. Both longitudinal and lateral speeds are controlled. Forward and lateral speeds are indicated on the display. In the present example, a forward, FWD, speed of 6 knots in indicated and a 5 knot speed to the left, LFT, is indicated. The hovering mode provides the pilot the option of moving laterally with no forward motion or to move at various angles relative to the direction the helicopter is pointed. The trim functions using trim switch 460 can adjust the speed with a corresponding trim motion: forward and backward adjust the longitudinal speed while left and right adjust the lateral speed.

Figure 10A:
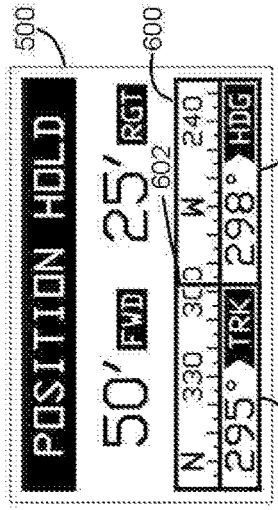
FIGS. 10a and 10b are screen shots which illustrate embodiments of the appearance of a display screen in a Position Hold mode.
Figure 10B:
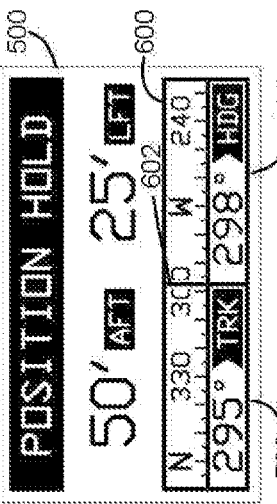

FIGS. 10a and 10b illustrate embodiments of the appearance of display 500 in a position hold mode. In an embodiment, the autopilot acquires the geographic position existing at the time of engaging this mode (within speed band 510 of FIG. 5) and then holds the rotorcraft over those geographic coordinates. This may result in both longitudinal and lateral motion to maintain position. FIG. 10a illustrates that the current position of the helicopter is 50 feet forward (FWD) and 25 feet to the right (RGT) of the designated coordinates, while FIG. 10b illustrates that the current position of the helicopter is 50 feet behind (AFT) and 25 feet to the left (LFT) of the designated coordinates. These measurements represent position error that can be the result of engaging position hold while initially moving over the position. The error is then corrected by the autopilot. Another reason for the position error indication may be due to a wind change such that the autopilot is not able to respond quickly enough to avoid a shift in position. In one embodiment of the position hold mode, the trim functions can operate in the same manner as in hovering flight and thus serve to increase or decrease speed. In this embodiment, actuation of the trim switch reverts operation to the hovering flight mode. Accordingly, the pilot can then maneuver to a new position and reselect the position hold mode. In another embodiment of the position hold mode, using the trim functions can shift the geographic target point over which the autopilot is instructed to hover.

Figure 11D:
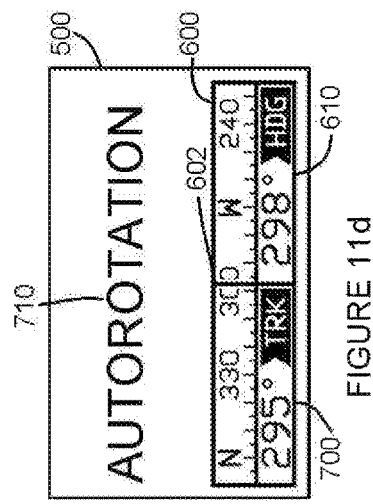
FIG. 11d is a screen shot which illustrates an embodiment of the appearance of a display screen in an autorotation mode.
Figure 11A:
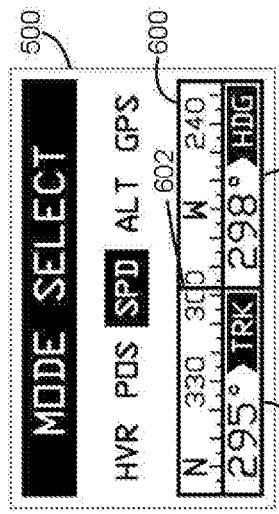
FIGS. 11a-11c are screen shots which illustrate embodiments of the appearance of a display screen in a Mode Select mode.

Attention is now directed to FIG. 11a which illustrates an embodiment of the appearance of display 500 in a menu mode that includes all flight modes that are enabled by the autopilot, as described above, including hover flight mode (HVR), position hold mode (POS), speed hold mode (SPD), altitude hold mode (ALT) and GPS mode (GPS). In menu embodiments described herein, the pilot can use left/right actuations of top-hat switch 460 to select a particular mode by highlighting the mode of interest. Of course, other display formats can readily adopt a vertical arrangement of modes and corresponding actuations of the top-hat switch. Any suitable approach may be used in this regard. In the present example, the speed mode (SPD) is highlighted. Depressing the top-hat switch to simultaneously actuate more than one switch can then select the highlighted mode. In certain circumstances, however, some modes may not be available based on the current flight status of the helicopter. Accordingly, menu screens can be customized based on the current flight status to allow selection of only those flight modes that are currently available, as will be described immediately hereinafter.

Figure 11B:
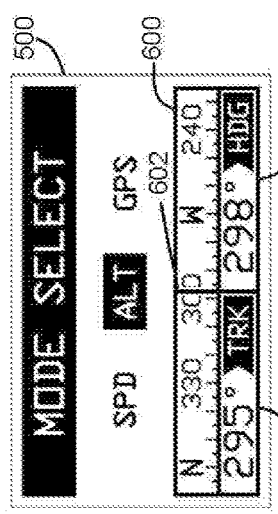

FIG. 11b illustrates an embodiment of the appearance of display 500 in a menu mode that corresponds to the operation of the helicopter on the front side of its power curve which can be above 60 knots for purposes of the present example. One of ordinary skill in the art relating to helicopter operation will appreciate that the autopilot of the present disclosure relies on pitching up the nose of the helicopter to cause a climb, since the autopilot is not controlling the collective of the helicopter. Such a climb can be performed on the front side of the power curve. Thus, the available flight modes shown in FIG. 11b include SPD, ALT and GPS. The hover mode and position hold modes are not available for selection. In another embodiment, however, on the back side of the power curve (from approximately 25 knots up to 60 knots, for purposes of the present example) display 500 can be customized to show only the availability of the speed hold mode (SPD). In this regard, on the back side of the power curve, induced drag is dominant and increases as the speed is reduced. It should be appreciated that in the altitude hold mode, the autopilot pitches up the nose of the helicopter to increase altitude. While this approach is operable on the front side of the power curve, it is not appropriate on the back side. That is, such a pitch up will attempt to cause a climb but will actually reduce the speed, which increases the drag. Accordingly, with less power than required, the helicopter will descend rather than climb. Thus, display 500 can limit mode selection to only speed hold mode (SPD) on the back side of the power curve, for example, when the autopilot is not configured for automated collective control.

Figure 11C:
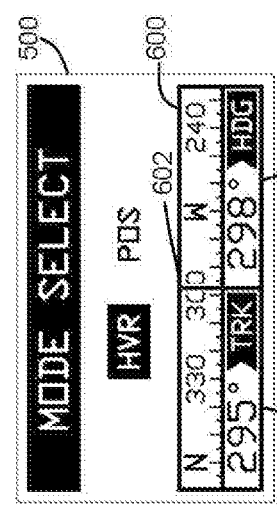

FIG. 11*c* illustrates an embodiment of the appearance of display 500 in a menu mode that corresponds to the operation of the helicopter in a low speed flight status that generally provides for lateral movement based on hovering, which can be below 25 knots in the present example. Accordingly, display 500 is customized to present menu options for selecting the hover flight mode (HVR) and the position hold mode (POS), which can function as described above.

FIG. 11*d* illustrates an embodiment of the appearance of display 500 in an autorotation mode that can be automatically activated, as described above. The autorotation mode can be executed in accordance with flight parameters to control descent in a way that provides appropriate airflow over the main rotor to maintain and/or increase rotor RPM preparatory to a flare for landing. In an embodiment, the autorotation mode initializes the autorotation, for example, as described above, and notifies the pilot to take over control. In this regard, display 500 can include an Autorotation indication 710. This latter indication can alternate with other indications to instruct the pilot to take over control and then disengage the autopilot. Other indications can be provided simultaneously. For example, an amber warning light can illuminated on the ADPU and the horn can sound. Any suitable combination of these various indications can be utilized. During operation, the autorotation mode can attempt to hold a constant airspeed and/or pitch angle for descent so that there is sufficient flow through the rotor to maintain the rotor speed at an acceptable rate. In one embodiment, the autorotation mode is only available automatically. In another embodiment, the autorotation mode can be provided as a menu selection for purposes of practice/training. By way of example, an autorotate selection can be added to the mode selections of FIG. 11*a*.

Figure 12:
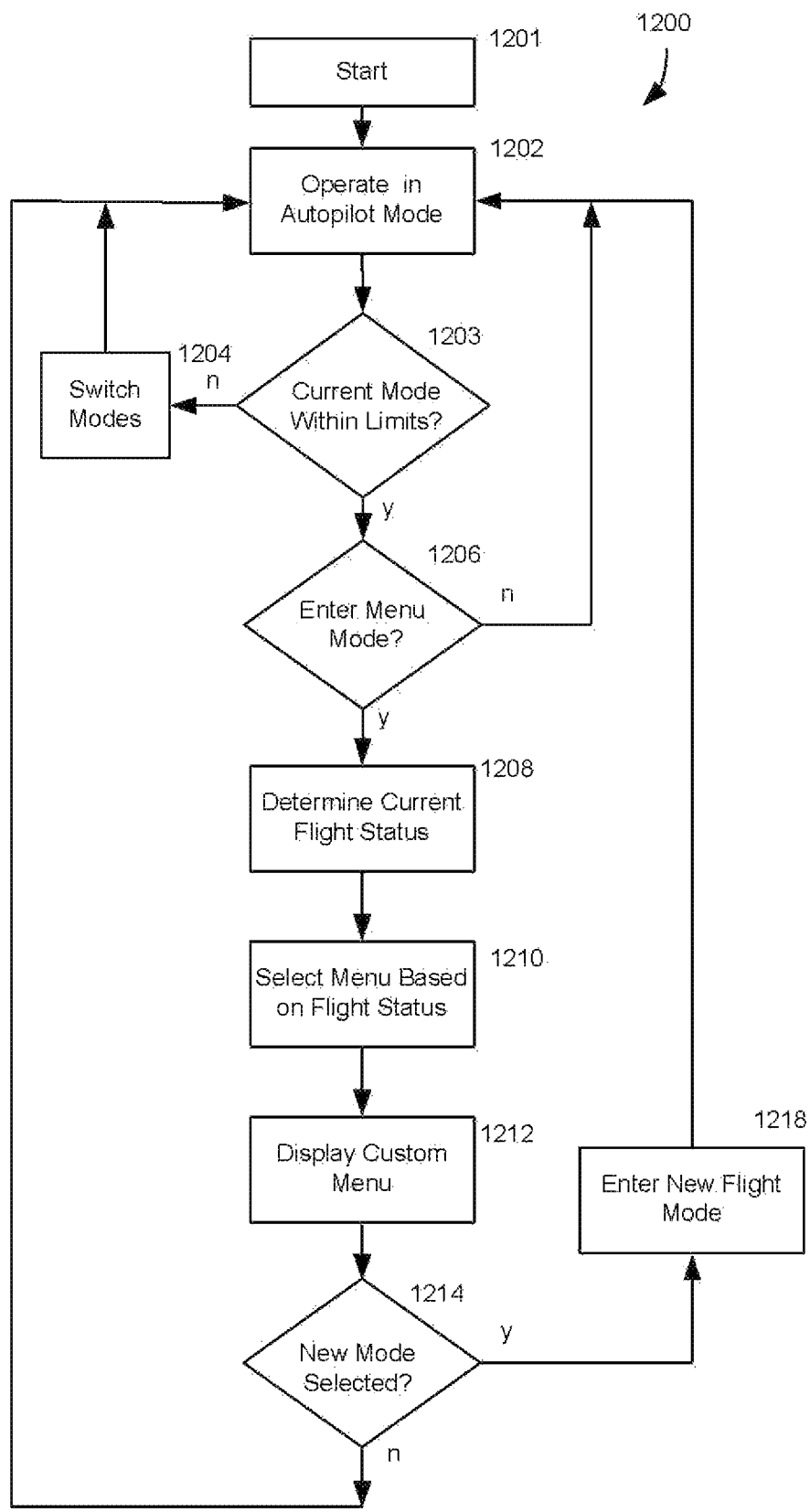
FIG. 12 is a flow diagram that illustrates an embodiment of a method for providing customized autopilot menu selections based, for example, on current flight statistics.

Referring to FIG. 12, an embodiment of a method for providing customized autopilot menu selections is generally indicated by the reference number 1200 based, at least in part, on the descriptions above. The method begins at start 1201 and proceeds to 1202 which continues operation in a current autopilot mode or a default mode at startup. At 1203, the autopilot compares the current flight statistics to a predetermined set of limits that can be associated with each mode. By way of non-limiting example, if the autopilot is currently operating in the altitude hold mode, the autopilot can determine whether the helicopter is operating on the back-side of the power curve. Such operation may occur, for example, responsive to the pilot lowering the collective, either intentionally or inadvertently, accompanied by a reduction in airspeed. As another example, the helicopter could have encountered a tail wind such that the ground speed may appear to indicate that the helicopter is operating on the front side of the power curve, but that is not actually found to be the case when the actual airspeed is determined. Operation on the back-side of the power curve can be detected in any suitable manner including, for example, airspeed measurement and/or an inability to hold altitude based on an amount of altitude loss and/or rate of descent. Based on the detection of an out-of-limits condition, the autopilot then automatically switches modes at 1204. In the present example, the autopilot can switch from the altitude hold mode to the speed hold mode. The autopilot can then either hold the speed at the time of detection or increment the speed enough to be on the front side of the power curve.

Having described the operation of steps 1203 and 1204 with respect to the altitude hold mode, limit values for other modes are now discussed. For any mode, in the instance of detecting that the airspeed of the helicopter is below 20 knots, step 1204 can automatically place the helicopter into hover mode. If the current mode is the hover mode and the airspeed is detected as being greater than 25 knots, step 1204 can automatically place the autopilot into speed hold mode. If step 1203 determines that the current mode is operating out of limits, it should be appreciated that a suitable notification can be provided to the operator.

If step 1203 determines that the current mode is within limits, operation proceeds to 1206 where the autopilot ADP monitors for a selection by the pilot to enter a menu mode. If no such selection is detected, operation returns to 1202. If a menu selection is detected, operation proceeds to 1208 for purposes of determining the current flight status of the helicopter. The current airspeed or ground speed can be used in conjunction, for example, with information relating to the helicopter model in which the autopilot is installed. Such information can detail, for example, upper and lower limits of the various speed bands associated with autopilot modes shown in FIG. 5. Operation then proceeds to 1210 which selects a customized menu based on the current flight status identified in step 1208. Appropriate selections can include, but are not limited to the embodiments shown in FIGS. 11*a*-11*c* along with variants thereof. At 1212, the customized menu is displayed to the pilot. At 1214, it is determined whether a menu selection has been made from the customized menu. If so, the new flight mode can be entered at 1218. It should be appreciated, in this regard, that the customized menu can allow the autopilot to re-enter the mode in which it was operating at the time of entering the menu mode or a different mode. Operation can then return to 1202 for operation in the new autopilot mode. The process can terminate at any time that disengage switch 450 (FIG. 4) is actuated by the pilot.

In view of FIG. 4 in conjunction with discussions of menu options above, it should be appreciated that the present disclosure brings to light an autopilot system for controlling the flight of a helicopter having a control stick that is operable by the pilot to manually control the flight of the helicopter with the pilot's hand in an engaged position on the control stick. The pilot is able to control and access all of the various modes of the autopilot without ever encountering the need to disengage his or her hand from the cyclic or collective control stick or handle. The pilot can use his or her thumb to actuate top-hat switch 460 without releasing or otherwise compromising control of the helicopter. This capability is provided, at least in part, based on locating all autopilot functional control directly on the cyclic within access of the pilot's hand in an engaged, flight position of the hand with the cyclic, as well as providing display and menu functionality in a cooperative manner which allows for navigation within and between the various autopilot modes using the autopilot functional controls on the cyclic grip.

The foregoing description of the invention has been presented for purposes of illustration and description. It is not intended to be exhaustive or to limit the invention to the precise form or forms disclosed, and other modifications and variations may be possible in light of the above teachings wherein those of skill in the art will recognize certain modifications, permutations, additions and sub-combinations thereof.

What is claimed is:

1. An autopilot system for controlling the flight of a helicopter, said autopilot system comprising:

a sensor arrangement that produces a set of sensor inputs for the autopilot system to characterize the flight of the helicopter for generating autopilot actuator control signals;

a processing arrangement that is configured to generate the autopilot actuator control signals based on no more than the set of sensor inputs to control the flight of the helicopter in a pilot selected one of a plurality of flight modes and to further generate a slaved gyro output signal based on no more than the set of sensor inputs;

an actuator arrangement to manipulate a cyclic control of the helicopter based on the actuator control signals to fly the helicopter;

and an autopilot display that is configured to display autopilot flight mode information to the pilot while displaying a slaved gyroscopic heading to the pilot based on the slaved gyro output signal;

wherein the sensor arrangement includes a yaw rate gyro that produces a yaw rate output and said processing arrangement is configured to integrate the yaw rate output to produce a yaw heading;

wherein the yaw rate gyro exhibits a yaw rate drift and the processing arrangement is configured to periodically update the yaw heading to compensate for said yaw rate drift;

wherein said sensor arrangement includes a GPS that produces a GPS heading and the processing arrangement periodically updates the yaw heading based on the GPS heading.

2. An autopilot system for controlling the flight of a helicopter, said autopilot system comprising:

a sensor arrangement that produces a set of sensor inputs for the autopilot system to characterize the flight of the helicopter for generating autopilot actuator control signals;

a processing arrangement that is configured to generate the autopilot actuator control signals based on no more than the set of sensor inputs to control the flight of the helicopter in a pilot selected one of a plurality of flight modes and to further generate a slaved gyro output signal based on no more than the set of sensor inputs;

an actuator arrangement to manipulate a cyclic control of the helicopter based on the actuator control signals to fly the helicopter;

and an autopilot display that is configured to display autopilot flight mode information to the pilot while displaying a slaved gyroscopic heading to the pilot based on the slaved gyro output signal;

wherein the sensor arrangement includes a yaw rate gyro that produces a yaw rate output and said processing arrangement is configured to integrate the yaw rate output to produce a yaw heading;

wherein the yaw rate gyro exhibits a yaw rate drift and the processing arrangement is configured to periodically update the yaw heading to compensate for said yaw rate drift;

wherein said sensor arrangement includes a magnetometer arrangement that produces a magnetic heading signal and the processing arrangement periodically updates the yaw heading based on the magnetic signal heading.

3. An autopilot system for controlling the flight of a helicopter, said autopilot system comprising:

a sensor arrangement that produces a set of sensor inputs for the autopilot system to characterize the flight of the helicopter for generating autopilot actuator control signals;

a processing arrangement that is configured to generate the autopilot actuator control signals based on no more than the set of sensor inputs to control the flight of the helicopter in a pilot selected one of a plurality of flight modes and to further generate a slaved gyro output signal based on no more than the set of sensor inputs;

an actuator arrangement to manipulate a cyclic control of the helicopter based on the actuator control signals to fly the helicopter;

and an autopilot display that is configured to display autopilot flight mode information to the pilot while displaying a slaved gyroscopic heading to the pilot based on the slaved gyro output signal;

wherein the sensor arrangement includes a triaxial rate gyro and a triaxial accelerometer for producing said set of sensor inputs and said processing arrangement is configured to generate a helicopter attitude including a yaw heading;

wherein the yaw heading is subject to a yaw rate drift that is exhibited by the triaxial rate gyro and the processing arrangement is configured to at least periodically adjust the yaw heading to compensate for said yaw rate drift and produce said slaved gyroscopic heading;

including a GPS receiver that produces a GPS heading and the processing arrangement periodically updates the yaw heading based on the GPS heading.

4. An autopilot system for controlling the flight of a helicopter, said autopilot system comprising:

a sensor arrangement that produces a set of sensor inputs for the autopilot system to characterize the flight of the helicopter for generating autopilot actuator control signals;

a processing arrangement that is configured to generate the autopilot actuator control signals based on no more than the set of sensor inputs to control the flight of the helicopter in a pilot selected one of a plurality of flight modes and to further generate a slaved gyro output signal based on no more than the set of sensor inputs;

an actuator arrangement to manipulate a cyclic control of the helicopter based on the actuator control signals to fly the helicopter;

and an autopilot display that is configured to display autopilot flight mode information to the pilot while displaying a slaved gyroscopic heading to the pilot based on the slaved gyro output signal;

wherein the sensor arrangement includes a yaw rate gyro that produces a yaw rate output and said processing arrangement is configured to integrate the yaw rate output to produce a yaw heading;

wherein the yaw rate gyro exhibits a yaw rate drift and the processing arrangement is configured to periodically update the yaw heading to compensate for said yaw rate drift;

including a magnetometer arrangement that produces a magnetic heading signal and the processing arrangement periodically updates the yaw heading based on the magnetic signal heading.

5. An autopilot system for controlling the flight of a helicopter, said autopilot system comprising: a plurality of sensors for generating a plurality of sensor outputs that characterize the flight of the helicopter; a processing arrangement that is configured to determine a current flight status of the helicopter based on the plurality of sensor outputs for operating the helicopter in a selected one of a plurality of autopilot flight modes and to generate a customized menu that includes a subset of one or more but less than all of the plurality of autopilot flight modes which subset is customized for pilot selection based on the current flight status of the helicopter; and a display for presenting the customized menu to the pilot for selection of one autopilot flight mode of the subset of autopilot flight modes.

6. The autopilot system of claim 5 wherein the helicopter flight is characterized by a power curve and said subset of the autopilot flight modes that is presented to the pilot is based on the current flight status of the helicopter with respect to said power curve.

7. The autopilot of claim 6 wherein said plurality of autopilot flight modes at least includes a position hold mode, a hovering flight mode, a speed hold mode, an altitude hold mode and a GPS mode.

8. The autopilot of claim 7 wherein said power curve includes a front side and, for a current flight status of the helicopter on the front side of the power curve, the subset of autopilot modes includes no more than the speed hold mode, the altitude hold mode and the GPS mode.

9. The autopilot of claim 7 wherein said power curve includes a back side and for a current status of the helicopter on the back side of the power curve the subset of autopilot modes includes only the speed hold mode.

10. The autopilot of claim 6 wherein said plurality of flight modes at least includes a position hold mode, a hovering flight mode, a speed hold mode, an altitude hold mode and a GPS mode and wherein the subset of autopilot modes is customized to include no more than the hover mode and the position hold mode when said current flight status of the helicopter is indicative of a low speed flight status.

11. For use with a helicopter including a rotor system having a cyclic control to control the flight of the helicopter and which helicopter at least generates a Low RPM signal that is indicative of a threshold low rotational speed of the rotor, an autopilot comprising: a sensor arrangement that produces a set of sensor outputs that characterize the flight of the helicopter for generating autopilot actuator control signals; an actuator arrangement that is configured for moving the cyclic control responsive to the autopilot actuator control signals; and a control arrangement that is configured for receiving an activation signal that is at least in part based on the Low RPM signal and the sensor outputs, and for responding to the activation signal by automatically activating an emergency descent mode to generate said autopilot actuator control signals responsive to the sensor outputs to first pitch the helicopter in a way that initially establishes a forward speed of the helicopter that is within a predetermined range of speed irrespective of a given forward speed at a time when the activation signal occurred.

12. The autopilot of claim 11 wherein the control arrangement is configured to increase the pitch of the helicopter to reduce the forward speed when the given forward speed is above said predetermined range at the time of the activation signal.

13. The autopilot of claim 11 wherein the control arrangement is configured to control only the cyclic control of the helicopter during the emergency descent mode.

14. The autopilot of claim 11 wherein the control arrangement is configured to receive the activation signal from an emergency collective actuator.

\* \* \* \* \*